April 22, 1930.  W. T. THOMPSON  1,755,376
ROAD OILER
Filed June 16, 1923   4 Sheets-Sheet 1

WITNESS:

INVENTOR
Watson T. Thompson
BY
ATTORNEY.

April 22, 1930.  W. T. THOMPSON  1,755,376
ROAD OILER
Filed June 16, 1923    4 Sheets-Sheet 2

WITNESS:

INVENTOR
Watson T. Thompson
BY
Frank L. Busser
ATTORNEY.

April 22, 1930.  W. T. THOMPSON  1,755,376
ROAD OILER
Filed June 16, 1923   4 Sheets-Sheet 3
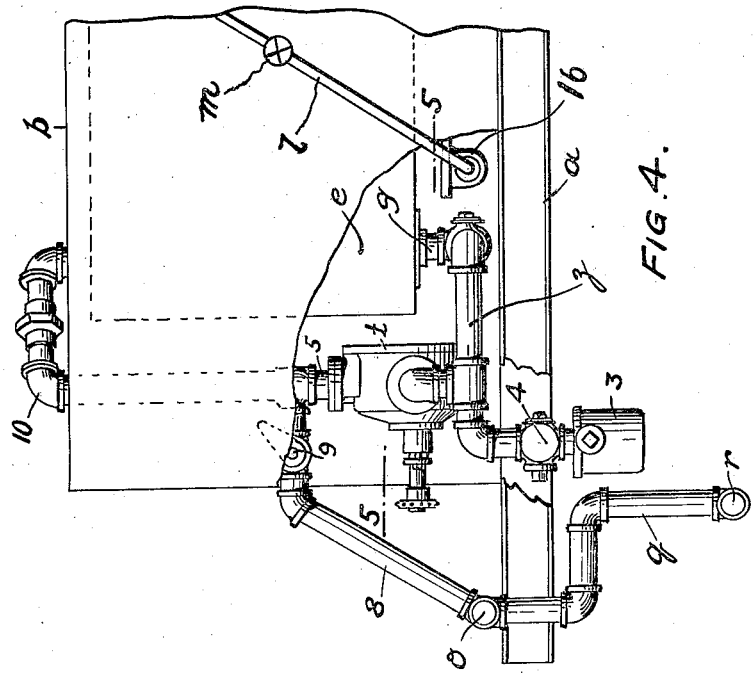
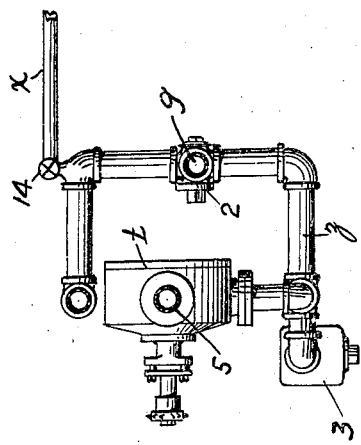
WITNESS:
Rob. R. Kitchel
INVENTOR
Watson T. Thompson
BY
Frank S. Busser
ATTORNEY.

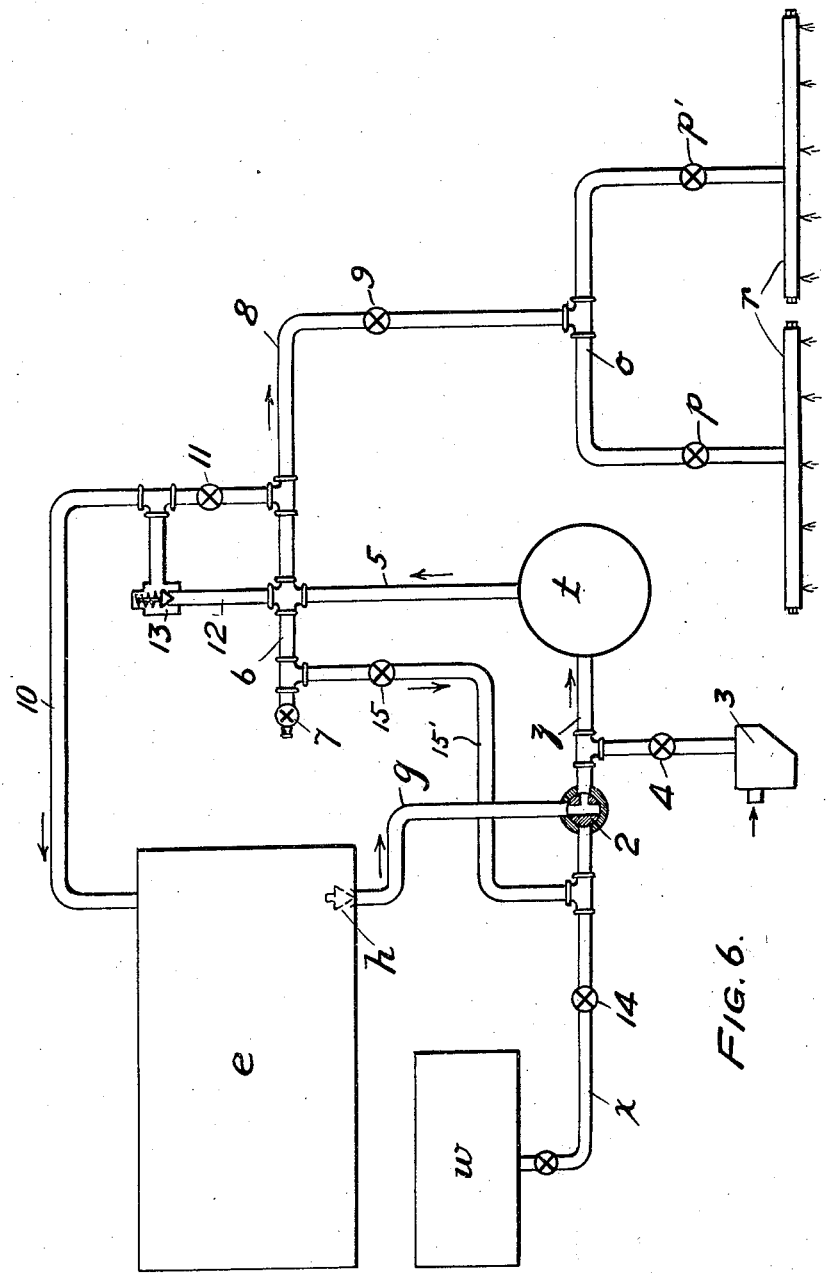

Patented Apr. 22, 1930

1,755,376

UNITED STATES PATENT OFFICE

WATSON T. THOMPSON, OF KENNETT SQUARE, PENNSYLVANIA, ASSIGNOR TO AMERICAN ROAD MACHINERY COMPANY, INC., OF KENNETT SQUARE, PENNSYLVANIA, A CORPORATION OF DELAWARE

ROAD OILER

Application filed June 16, 1923. Serial No. 645,719.

My invention relates to mechanism for containing, transporting and distributing oil or asphaltum and like products to road surfaces.

At the present time there are widely used various devices for distributing oil or asphaltum to road surfaces, in the construction of highways and other roads and in their maintenance and repair, as well as for more or less permanently laying surface dust during the dry summer seasons.

The various devices heretofore in use have proved substantially satisfactory, but are open to a number of serious objections which cut down their efficiency and add to the cost of distribution. Such machines are more especially inefficient when handling the heavier road oils as "Tarvia" for example, since it is difficult to bring the supply of material up to and maintain it at the proper temperature and difficulty is met with in maintaining clean the various conduits, valves, the distributor etc. A further disadvantage of the types of machines now in use is that they require motive power, in the form, for example, of a motor chassis, which is devoted solely to their use, since removal and attachment of the various devices constituting the "oiler" is a considerable task, requiring a good deal of time and skilled workmen.

In accordance with my invention, I provide a "road oiler" as a unit, apart from the necessary motive power, which may be readily mounted on or dismounted from an ordinary truck chassis, in a minimum of time and with comparatively unskilled labor.

Further, I provide a "road oiler" in which the supply of material for distribution may be quickly brought up to and maintained at a uniform temperature, irrespective of the viscosity of the material, so that when distribution is interrupted no time is lost because of cooling of the material.

Further, I provide a "road oiler" in which all the conduits, valves, the distributor, etc., may be quickly and conveniently cleaned without the necessity for uncoupling any of the piping or otherwise dismounting the machine.

Having now indicated, in a general way, the nature, purpose and advantages of my invention, I will proceed to a detailed description of a preferred embodiment thereof, with references to the accompanying drawings, in which—

Fig. 4 is a side elevation of the rear portion of a unit embodying my invention partially broken away to show pipe connections.

Fig. 5 is a detail view showing a pump and pipe connections.

Fig. 6 is a diagrammatic illustration of the circulating system of the oiler.

Figure 1:
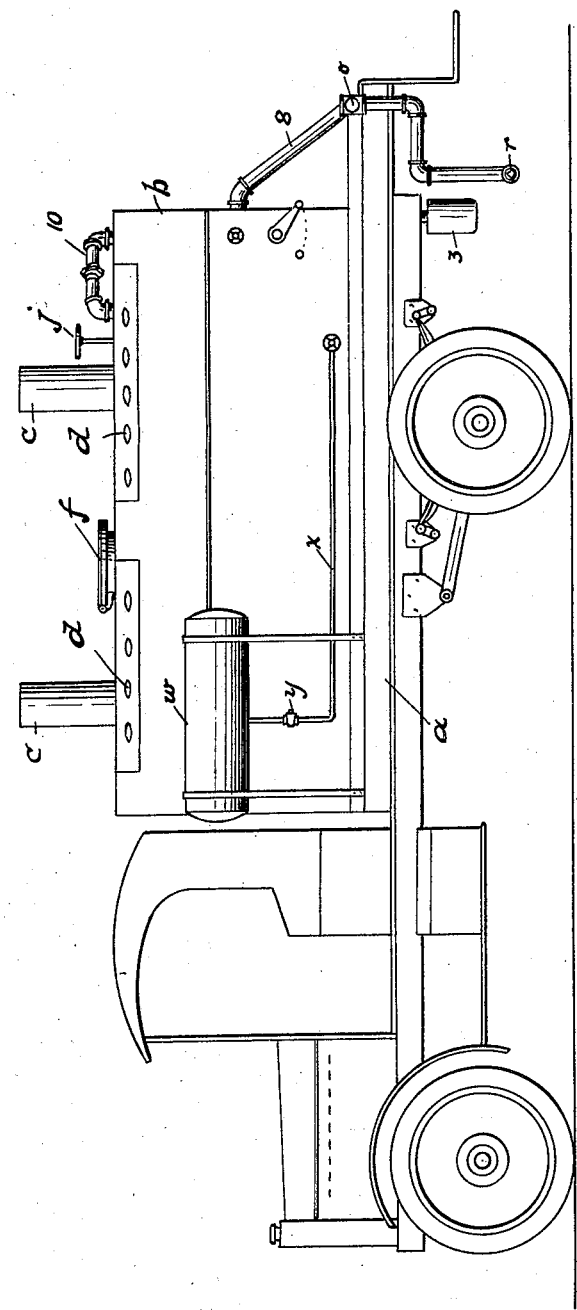
Fig. 1 is a side elevation of a road oiler unit embodying my invention, mounted on a motor truck.
Figure 3:
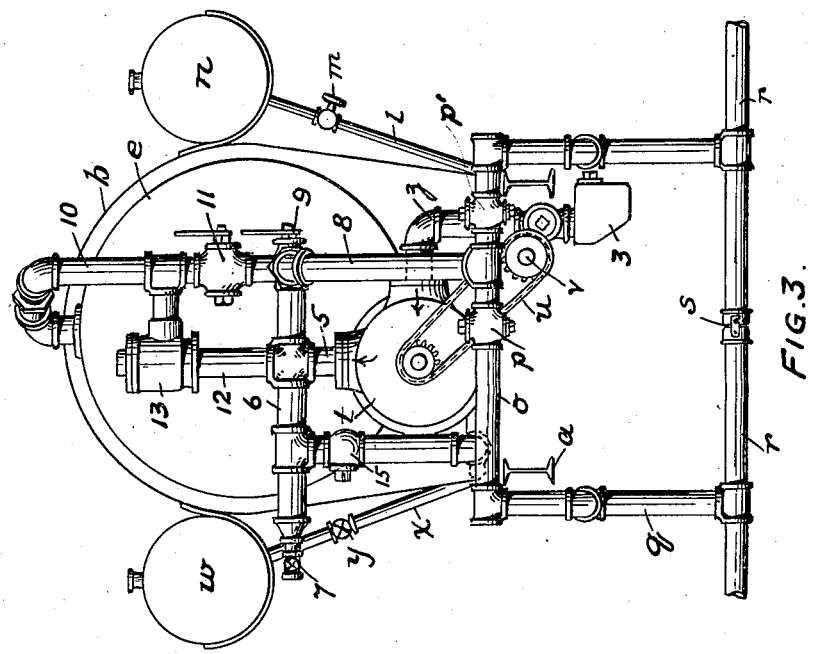
Fig. 3 is a view of the unit showing details of construction.
Figure 2:
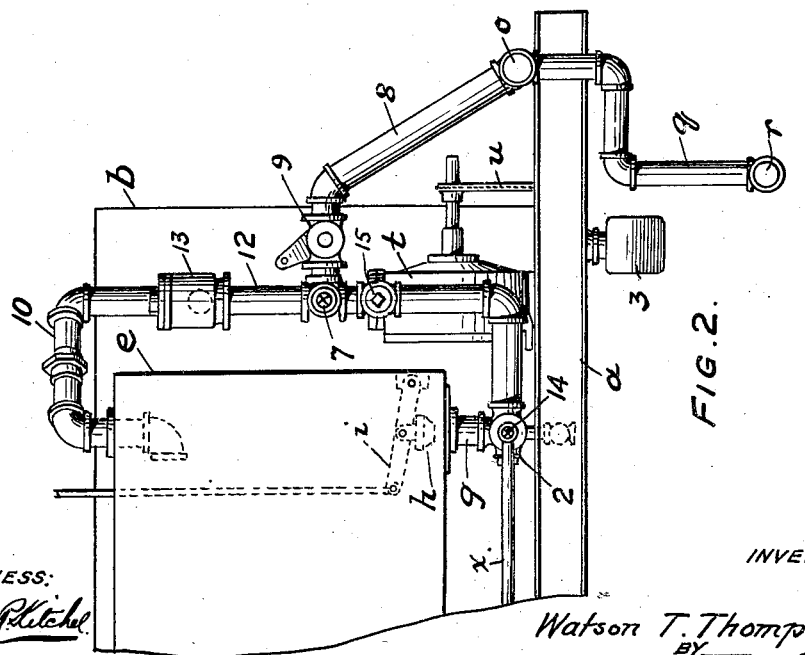
Fig. 2 is a rear view of the unit shown in Fig. 1, apart from the motor truck.

$a$ indicates a frame, upon which the unit is mounted, adapted to rest on and be secured to the chassis of a motor truck, of the required capacity to carry the unit and supply of material to be distributed.

$b$ indicates a casing, preferably lined with asbestos or other convenient insulating material, secured to the frame and enclosing the various elements composing the unit. The casing is provided with stacks $c$ $c$ and ventilating apertures $d$ to permit of circulation of air within the casing.

Within the casing $b$ and supported by the frame $a$ is a tank $e$, adapted to carry material to be distributed, provided at the top with a filler hole and cover $f$, which extends through the casing, and provided in its bottom with an aperture for the reception of a pipe $g$. The aperture and consequently the flow of material from the tank is controlled by means of an internal valve $h$, carried by a pivoted lever $i$ and operated manually, from the top of the casing, through the medium of a rod $j$. Supported by the frame $a$ and positioned beneath the tank $e$ is a burner 16 of a type, for example, as that illustrated in an application for patent filed by me Feb. 26, 1923, Serial No. 621,177, but adapted to heat and maintain heated the contents of the tank. The burner is supplied with fuel, through a fuel pipe $l$, valved as at $m$, from a tank $n$ supported externally of the casing, and thus out of the zone of heat from the burner. In a unit such as illustrated, three similar burners would be disposed beneath the length of the tank.

Supported at the rear of frame $a$ is a manifold $o$, provided with valves $p$, $p'$, and from which extend downwardly, backwardly and downwardly pipes $q$, $q$ connected to an apertured distributor formed by two sections of pipe $r$, $r$ connected at their abutting ends as at $s$.

Supported by the frame adjacent the rear end of the tank $e$ is a pump $t$ adapted to be driven by means of a chain $u$ from a shaft $v$ suitably driven from the truck motor, as, for example, through a take-off from the truck transmission.

A tank $w$, adapted to contain a cleaning fluid, is supported on the casing $b$ and provided with an outlet pipe $x$ having a shut-off valve $y$.

The pipe $g$ leading from the bottom of the tank is connected to the pump through piping $z$, connection with which is made through a valve 2. The pipe $x$ leading from the cleaning fluid tank $w$ is connected with the piping $z$ through a valve 14. By manipulation of the valves 2 and 14, the pump may be made to draw material from either the main tank or from the cleaning fluid tank. A strainer pot 3 for connection with a source of supply of material is connected with pipe $z$ through a valve 4.

The discharge of the pump is connected to a pipe 5 which connects with a header 6. At one end, the header is reduced for the reception of a patching hose and provided with a valve 7. Adjacent its other end, the header is connected to the manifold $o$ of the distributor, between valves $p$, $p'$, by means of a pipe 8, valved as at 9. Piping 10 connects the header with the top of the main tank and is provided with a valve 11.

A by-pass 12, provided with a safety valve 13, connects header 6 with piping 10 around valve 11.

A connection 15', in which is interposed a valve 15, joins the header 6 with the line $x$ leading from the tank $w$ containing the cleaning fluid.

The operation of the device will, it is believed, be clear from the above description of the component parts and arrangement thereof taken with the following:

Assuming that the apparatus has not been used and all the valves shut off: When it is desired to put the apparatus in operation, the burner fuel tank $n$ is first filled with kerosene oil through the filler hole at the top and the truck may then be run to the location of the source of supply of material to be distributed and from which the main tank $e$ is filled, which may be, for example, fixed tanks or a tank car.

The main tank $e$ may be filled through the opening in its top, after raising cover $f$, by gravity or outside pump, or the pump $t$, forming a part of the apparatus, may be used to draw material from the supply and force it into the tank. Where the pump $t$ is used, a suitable hose is connected to the strainer pot 3 and led to the source of supply. The valve 4 is opened, giving access to the suction side of the pump, and the valve 11 is opened, giving a passage from the pump discharge to the tank. The pump is then started and material drawn from the supply is discharged into the tank. When the tank is full, valves 4 and 11 are shut off.

The tank having been filled, for example, with material required to be kept hot in order to have the necessary fluidity for proper distribution, the burners beneath the tank $e$ are lighted, after opening valve $m$ in pipe $l$ leading from fuel tank $n$. Since a considerable quantity of material, usually of a rather heavy bituminous character, is contained in the tank, there is provided means for circulating the material in order to insure uniform and complete heating.

The burners having been started, the valve $h$ within the tank is opened through rod $j$. Valve 2 is opened to permit pump $t$ to draw material from the tank, and valve 11 is opened permitting the pump to discharge into the tank after which the pump is started and the material in the tank circulated while the truck proceeds from the source of supply to the point of distribution.

On reaching the point of distribution and it being desired to distribute the contents of the tank on, for example, a road surface, the sections $r$, $r$ are abutted and secured together by means of hook $s$, valve 11 is closed and valves $p$ and $p'$ are opened. When it is desired that distribution shall commence valve 9 is opened and pump $t$ started. It will be noted that by virtue of the provision of valves $p$, $p'$ either side of the distributor may be uesd alone one side or the other being shut off by means of either valve $p$ or valve $p'$. It will be further noted that should the entire capacity of the pump, developed at convenient truck speed, be not needed, the valve 11 may be more or less opened to permit the by-pass of material back into the tank.

Assuming that the material in tank $e$ has all been distributed, there is provided in tank $w$ a cleaning fluid which may be drawn into the pump and discharged through the piping and distributor while they are hot for the purpose of cleaning out the heavy material before it has a chance to cool and clog up the piping.

When distribution is completed, all valves should be closed and valves $y$ and 14 in pipe $x$, leading from cleaning fluid tank $w$, and valve 15 opened. When the pump is then operated and cleaning fluid will pass into and through the pump and piping directly beneath the tank, returning from the header 6 to the intake side of the pump through connection 15'. After the cleaning fluid is so circulated, valves 9, $p$ and $p'$ are opened and cleaning fluid discharged through the nozzles in the manifold pipes.

After the manifold is cleaned out as above and while all piping is hot, the distributing tank being empty valve $y$ should be closed and valves 4, 2, 9, 11, 7, $p$, $p'$, 15, and valve $h$ should be opened to permit all bituminous material to drain from the pipes.

Should the condition arise where material is left in the tank after a required surface is covered or at the end of a working day, such material may be removed from the tank before cooling is permitted and for this purpose there is provided a valve 7 to which a hose may be attached through which the material in the tank may be discharged by the pump when valves 2 and 7 are opened.

Valve 7 may also be utilized for attaching a patching hose through which material may be discharged for distribution by hand to portions of a road surface not reached or properly covered by the distributor.

In order that the apparatus shall not be damaged if through error the pump is started with the discharge valves closed, there is provided the by-pass 12 in which is placed a safety valve 13, so adjusted as not to interfere with normal operation of the pump in circulating material or discharging it, but adapted to relieve the pump if its discharge is not open.

Having now fully described my invention, what I claim and desire to protect by Letters Patent is:

A road oiler having a tank for the oil, a pump having an inlet and an outlet, a connection from the bottom of the tank to the pump inlet, a header connected to the pump outlet, a distributor for the oil, a connection between the distributor and the header, a connection between the header and the tank, a conduit leading from said header back to the pump inlet, a valve in each connection whereby the flow through said connections may be controlled without affecting the flow passage through other connections, and means for delivering cleansing fluid to the pump inlet.

In testimony of which invention, I have hereunto set my hand, at Kennett Square, Pa., on this 13th day of June, 1923.

WATSON T. THOMPSON.